(12) United States Patent
Van Curen et al.

(10) Patent No.: US 9,779,633 B2
(45) Date of Patent: Oct. 3, 2017

(54) VIRTUAL REALITY SYSTEM ENABLING COMPATIBILITY OF SENSE OF IMMERSION IN VIRTUAL SPACE AND MOVEMENT IN REAL SPACE, AND BATTLE TRAINING SYSTEM USING SAME

(71) Applicants: Greg Van Curen, Fremont, IN (US); Minchul So, Seoul (KR); Samuel Farina, III, Crown Point, IN (US)

(72) Inventors: Greg Van Curen, Fremont, IN (US); Minchul So, Seoul (KR); Samuel Farina, III, Crown Point, IN (US); Ho-Sung So, Seoul (KR)

(*) Notice: Subject to any disclaimer, the term of this patent is extended or adjusted under 35 U.S.C. 154(b) by 0 days.

(21) Appl. No.: 15/427,284

(22) Filed: Feb. 8, 2017

(65) Prior Publication Data

US 2017/0148339 A1   May 25, 2017

Related U.S. Application Data

(63) Continuation of application No. PCT/KR2015/008319, filed on Aug. 7, 2015, which
(Continued)

(51) Int. Cl.
| | |
|---|---|
| G09B 9/00 | (2006.01) |
| G06F 3/01 | (2006.01) |
| G06T 19/00 | (2011.01) |

(52) U.S. Cl.
CPC ............. *G09B 9/003* (2013.01); *G06F 3/012* (2013.01); *G06F 3/013* (2013.01); *G06T 19/006* (2013.01)

(58) Field of Classification Search
CPC ........ G06F 3/011; G09B 9/003; G06T 19/006
See application file for complete search history.

(56) References Cited

U.S. PATENT DOCUMENTS

| 5,846,134 A | 12/1998 | Latypov |
|---|---|---|
| 6,012,926 A | 1/2000 | Hodges et al. |

(Continued)

FOREIGN PATENT DOCUMENTS

| KR | 1020100047563 | 5/2010 |
|---|---|---|
| KR | 1020120044461 | 5/2012 |

(Continued)

OTHER PUBLICATIONS

Written Opinion and International Search Report, including an English translation of the International Search Report, dated Dec. 14, 2015 for International Application No. PCT/KR2015/008319 (13 pages).

*Primary Examiner* — Zhengxi Liu
*Assistant Examiner* — Jonathan M Cofino
(74) *Attorney, Agent, or Firm* — Taylor IP, P.C.

(57) ABSTRACT

A virtual reality system includes a playground defined within a real world space to have a predetermined area in which a user is movable, a head mounted device surrounds both eyes displaying an image of a virtual space formed corresponding to real objects in the playground, a sensor attached to a predetermined location in the playground, the head mounted device or body of the user sensing an actual location or motion of the user in the playground. A control unit calculates a location and direction of the user in the playground according to a signal from the sensor, and displays an image on the head mounted device of the virtual space, observed at the location and in the facing direction of the user. When the user wearing the head mounted device actually moves in the playground, a feeling of moving in the virtual space is given to the user.

7 Claims, 11 Drawing Sheets

Related U.S. Application Data is a continuation-in-part of application No. 14/455,464, filed on Aug. 8, 2014, now Pat. No. 9,599,821.

(56) References Cited

U.S. PATENT DOCUMENTS

| | | | |
|---|---|---|---|
| 6,388,657 | B1 | 5/2002 | Natoli |
| 6,459,989 | B1* | 10/2002 | Kirkpatrick ............ G01S 5/0027 340/426.1 |
| 6,559,813 | B1 | 5/2003 | DeLuca et al. |
| 8,206,218 | B2 | 6/2012 | Gutierrez Novelo |
| 8,615,383 | B2 | 12/2013 | Dobbins et al. |
| 2001/0031662 | A1 | 10/2001 | Larian |
| 2004/0252940 | A1 | 12/2004 | Atac et al. |
| 2009/0061901 | A1* | 3/2009 | Arrasvuori ............ G06Q 30/00 455/456.3 |
| 2010/0182340 | A1 | 7/2010 | Bachelder et al. |
| 2012/0115598 | A1* | 5/2012 | Hagstrom ............ G06T 19/006 463/31 |
| 2012/0242696 | A1 | 9/2012 | Martin |
| 2012/0242697 | A1 | 9/2012 | Border et al. |
| 2012/0287159 | A1 | 11/2012 | Bett |
| 2012/0293550 | A1 | 11/2012 | Lo et al. |
| 2013/0083003 | A1 | 4/2013 | Perez et al. |
| 2013/0128364 | A1 | 5/2013 | Wheeler et al. |
| 2013/0182902 | A1 | 7/2013 | Holz |
| 2013/0335407 | A1 | 12/2013 | Reitan |
| 2014/0306866 | A1 | 10/2014 | Miller et al. |
| 2014/0335893 | A1 | 11/2014 | Ronen |
| 2015/0260474 | A1* | 9/2015 | Rublowsky ............ F41A 33/00 434/16 |
| 2015/0323993 | A1 | 11/2015 | Levesque et al. |
| 2017/0120148 | A1* | 5/2017 | Yim ............ A63F 13/52 |

FOREIGN PATENT DOCUMENTS

| | | |
|---|---|---|
| KR | 10-2013-0098741 | 9/2013 |
| KR | 101333147 | 11/2013 |
| WO | 2012/026680 A2 | 3/2012 |

* cited by examiner (a)

(b)

VIRTUAL REALITY SYSTEM ENABLING COMPATIBILITY OF SENSE OF IMMERSION IN VIRTUAL SPACE AND MOVEMENT IN REAL SPACE, AND BATTLE TRAINING SYSTEM USING SAME

CROSS REFERENCE TO RELATED APPLICATIONS

This is a continuation of PCT application No. PCT/KR2015/008319, entitled "VIRTUAL REALITY SYSTEM ENABLING COMPATIBILITY OF SENSE OF IMMERSION IN VIRTUAL SPACE AND MOVEMENT IN REAL SPACE, AND BATTLE TRAINING SYSTEM USING SAME", filed Aug. 7, 2015, which claims priority to U.S. patent application Ser. No. 14/455,464 filed on Aug. 8, 2014, the disclosure of which is incorporated herein by reference.

TECHNICAL FIELD

The present disclosure relates to a virtual reality system.

BACKGROUND ART

A virtual reality system generally includes an output device for displaying a virtual space to a user, an input device for receiving a motion of the user, and a control device (computer) for changing the virtual space by reflecting the motion of the user input from the input device thereto and displaying the changed visual space to the output device.

The output device is generally a display device which allows a virtual space to be felt through the sense of sight of a human. The output device may be a computer monitor (screen), which is the simplest example, and may also employ a surrounding screen or a head mounted device to enhance the immersion. The head mounted device is generally worn on the head to surround both eyes of a user. The head mounted device includes displays respectively at the front of both left and right eyes and displays a left eye image and a right eye image respectively on the left and right displays so that a three-dimensional image may be naturally displayed. In particular, in case of the head mounted device, since a user may view only a virtual space, which is a three-dimensional image, implemented by the left and right eye images, the user feels as if he/she is actually in the virtual space, and thus the immersion in a virtual space is more excellent in comparison to any other output device.

In addition, the output device may further include a stereo speaker for giving sounds so that the virtual world may be felt through the auditory sense of a human (sounds may be provided only to the user through an earphone), and may also further include an air blower or a sprayer for giving olfactory or touch stimulations such as wind, fog and smell to enhance the reality of the virtual world.

The input device is used for detecting a motion of the user when the user moves in an actual space for the motion or movement in a virtual space. The input device may use not only simple computer input devices such as a keyboard, a mouse and a joystick but also various devices such as a camera sensor separated from the user to photograph the user, a motion sensor such as an acceleration sensor attached to a body of the user to sense a motion of the user, and a specially designed device such as treadmill or a sensor-mounted chair or vehicle, which allows the user to walk or move on the spot and senses the walking or motion of the user.

However, even though any of such various output devices and input devices is used, in the virtual reality systems which have been developed until now, the user cannot make actual movement such as walking or running in an actual space. It is because that if a simple monitor or a surrounding monitor is used as the output device, the monitor should be fixed to a specific location, and therefore the user cannot play a game unless he/she is at the front of the monitor. In addition, if the head mounted device is used as the output device, the user may freely move theoretically since the display is always at the front of the user even though the user moves in the actual space. However, in this case, the user is able to watch only a virtual space displayed by a display of the head mounted device and is not able to watch the ground or obstacle in a real world (actual space) out of the head mounted device. Therefore, even in this case, the user cannot actually walk or run.

Therefore, the virtual reality system using a head mounted device which has been developed until now just uses an input device such as a specific chair or vehicle which allows a user to make a motion just on the spot, but such an input device does not reflect a feeling of walking or moving of the user in the actual space, which deteriorates the fun and reality of a game and is also not sufficiently helpful for actual exercise or training of the user.

Meanwhile, a device having a small display for displaying information at the front of the eye of a user so that the user may watch the information provided by the display together with a real world has been proposed, for example 'Google glass' recently released. If this device is used as the output device, a user may make active movement such as walking and running since the user may watch the ground and obstacles in the actual space. However, even though the Google glass is useful for watching auxiliary information in addition to a real world seen by the user, a system using the Google glass gives very deteriorated immersion in a virtual space (when the auxiliary information is regarded as an image of the virtual space) in comparison to the above head mounted device, and thus the Google glass cannot be regarded as a true virtual reality system.

Here, the Google glass may also be regarded as a head mounted device since it is worn on the head, but in this specification, the 'head mounted device' just means a device capable of showing only a virtual space, and this will also be called a 'immersive' head mounted device if it should be distinguished from a device such as a Google glass capable of showing auxiliary information in addition to a real world.

In a virtual reality system which has been developed until now, it is impossible to allow the immersion in a virtual space to consist with an actual movement of a user in an actual space.

DISCLOSURE

Technical Problem

The present disclosure is directed to providing a virtual reality system, which may allow the immersion in a virtual space to consist with an actual movement in an actual space by allowing a user to feel as if he/she actually moves in a virtual space when the user actually moves in an actual space.

Furthermore, the present disclosure provides a battle training system capable of maximizing battle training effects by dividing users into friendly troops and enemy troops so as to provide a sense of engagement in battle in a real battle training field even in an actual space, which is not in a real battle training field, by applying the virtual reality system to battle training.

Technical Solution

A virtual reality system according to an aspect of the present disclosure includes a play ground defined within an actual space of a real world to have a predetermined area in which a user is actually movable; a head mounted device having a display for displaying an image of a virtual space formed corresponding to real objects in the play ground and worn by the user to surround both eyes; at least one sensor attached to at least one of a predetermined location in the play ground, the head mounted device, and a body of the user to sense an actual location and a gazing direction of the user in the play ground; and a control unit for calculating an actual location and a gazing direction of the user in the play ground according to a signal received from the at least one sensor, and controlling the head mounted device to display an image of the virtual space, observed at the actual location and in the gazing direction of the user, on the display, wherein when the user wearing the head mounted device actually moves in the play ground, a feeling of actually moving in the virtual space is given to the user.

Here, the control unit may control the head mounted device to further display an image of a virtual object, not present in the play ground, to the image of the virtual space displayed on the display, the virtual object may be a virtual character which interactively moves by means of at least one of conversation with the user, education, training, fight, and combat, and the virtual object may be a virtual exhibit fixed to a predetermined location in the virtual space.

In addition, the control unit may be implemented by a computer separated from the user, and may be electrically connected to the at least one sensor by means of wireless communication.

Alternatively, the control unit may be implemented by a computer possessed or worn by the user, and further, the control unit may be implemented by a smart phone possessed or worn by the user, and in this case, the at least one sensor may be included in the smart phone.

Furthermore, the at least one sensor may include an acceleration sensor or a gyro sensor mounted to the head mounted device, and the control unit may calculate an actual location and a gazing direction of the head mounted device according to a signal input from the acceleration sensor or the gyro sensor.

Alternatively, the at least one sensor may include a camera sensor installed at a predetermined location in the play ground, and the control unit may calculate an actual location and a gazing direction of the head mounted device according to an image photographed by and input from the camera sensor.

Further, the at least one sensor may include an emission element mounted to the head mounted device to emit an electromagnetic wave of a predetermined wavelength, and at least two detection elements installed at predetermined locations in the play ground to detect the electromagnetic wave, and in this case, the emission element may include two emission elements spaced apart from each other by a predetermined distance, the at least two detection element respectively may sense locations of the two emission elements by detecting both of electromagnetic waves emitted from the two emission elements, and the control unit may calculate locations of the two emission elements, respectively, according to signals input from the at least two detection elements, calculate a center point of the locations of the two emission elements as a current location of the head mounted device, and calculate a direction of a perpendicular bisector at the locations of the two emission elements as a current facing direction of the head mounted device.

Furthermore, the at least one sensor may include a plurality of motion detection sensors respectively attached to a plurality of body portions of the user.

In addition, preferably, the display includes a left eye display and a right eye display respectively corresponding to both left and right eyes of the user, and the left eye display displays a left eye image which is an image obtained when the left eye of the user sees the virtual space, and the right eye display displays a right eye image which is an image obtained when the right eye of the user sees the virtual space, respectively.

In this case, the head mounted device may include an eye tracking unit for detecting the pupil of the user, and the control unit may calculate a location of the pupil of the user according to a signal input from the eye tracking unit, calculate a gazing point which is currently gazed by the user therefrom, and control the head mounted device to display on the display an image in which the gazing point is focused.

A battle training system based on virtual reality according to another aspect of the present disclosure includes a gun which is possessed by each of at least two users and transmits a shooting signal wirelessly when shooting; at least one sensor configured to sense an actual location and a gazing direction of each of the at least two users, in at least one play ground defined within an actual space of a real world to have a predetermined area in which the users are actually movable, and sense a direction of a gunpoint of the gun; a head mounted device having a display for displaying an image of a virtual space and worn by each user to surround both eyes of each user; and a control unit configured to calculate an actual location and a gazing direction of each user in the play ground according to a signal received from the at least one sensor, and transmit the image of the virtual space formed corresponding to real objects in the play ground, observed at the actual location and in the gazing direction of each user, to the head mounted device of each user, wherein when any one user is present in an actual space corresponding to an actual location and a gazing direction of the other user, the control unit is configured to display a virtual object corresponding to the one user in a virtual space of the other user in an actual direction with a size proportional to a distance between the users, and when receiving the shooting signal, the control unit is further configured to receive input of the signal from the at least one sensor, calculate the gunpoint direction, and display shooting information at an enemy in the virtual space when the enemy is located in the gunpoint direction in the virtual space.

The at least one sensor may include a camera sensor, and the control unit may be configured to analyze a shape of the user from an image of the user photographed by the camera sensor and display a virtual object corresponding to the analyzed shape of the user in the virtual space.

The at least one play ground may include two play grounds with a same size and structure installed apart from each other, and at least one user is located in each play ground, and the control unit may be configured to display a virtual object corresponding to the user in other play ground, in a virtual space transmitting to a head mounted device of the users in each play ground, based on an actual location and a gazing direction of the users in each play ground.

When a user is present in an actual space of any one play ground corresponding to an actual location and a gazing direction of other user in other play ground, the control unit may be configured to display a virtual object corresponding to the user in a virtual space of other user in other play ground in an actual direction with a size proportional to a distance between the users.

The at least one sensor may include an acceleration sensor or a gyro sensor mounted in the head mounted device, and the control unit may configured to receive input of a signal from the acceleration sensor or gyro sensor, calculate an actual location and a facing direction of the head mounted device, and set it as an actual location and a gazing direction of the user.

The at least one sensor may include an acceleration sensor or a gyro sensor mounted in the gun, and the control unit may be configured to receive input of a signal from the acceleration sensor or gyro sensor and calculate the gunpoint direction.

Alternatively, a laser pointer which emits a laser may be installed in the gun, the at least one sensor may include a camera sensor for recognizing the laser, and the control unit may be configured to analyze a trajectory of the laser from an image captured by the camera sensor and determine the trajectory of the laser as the gunpoint direction.

The at least two user may wear a battle clothing comprising a vibration means and a signal receiver, the control unit may be configured to transmit a control signal about shooting to a signal receiver of a battle clothing of a user corresponding to the enemy, and the vibration means may be configured to generate vibration when the signal receiver receives the control signal.

Advantageous Effects

According to the present disclosure, since a user may utilize abundant virtual objects in a virtual world while actually moving in an actual space, it is possible to provide a new-generation entertainment system where the immersion in a virtual space may consist with the actual movement in an actual space.

Furthermore, according to the present disclosure, users are divided into friendly troops and enemy troops, and feel as if they engage in battle in a real battle training field even in a real space, which is not in a real battle training field, thereby maximizing battle training effects.

Other additional features and advantages of the present disclosure will be more clearly understood from the following detailed description.

MODE FOR CARRYING OUT THE INVENTION

Hereinafter, preferred embodiments of the present disclosure will be described in detail with reference to the accompanying drawings.

Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

In the related art described above, the immersion in a virtual space has not consisted with an actual movement in an actual space because a user is not able to see a real world in a state of wearing an immersive head mounted device. In other words, a human learns to set foot while sensing a real world, particularly in a visual way (more preferably, by means of a three-dimensional vision), but the head mounted device blocks the vision for the real world. Therefore, a general virtual reality system, which includes a head mounted device worn by a user so that the user may immerse in a virtual space and play a game, just allows the user to move on the spot.

In the present disclosure, a user may utilize abundant virtual objects (for example, virtual enemies or virtual exhibits) provided in a virtual world while actually moving in an actual space. In order to allow the immersion in a virtual space to consist with the actual movement in an actual space as described above, the virtual space displayed on a display of the head mounted device should be visually recognized by the user with the same size and visual field as the actual space. Detailed means and methods for this will be described later, and specific embodiments of the virtual reality system according to the present disclosure will be described first.

The virtual reality system of the present disclosure may be very suitably implemented as an entertainment system, without being limited thereto. Here, the 'entertainment system' using virtual reality in the present disclosure includes a system in which any kind of feeling perceivable by a user who is moving in a real world, for example game, exercise, education/training, viewing or the like can be reproduced in a virtual space.

Figure 1:
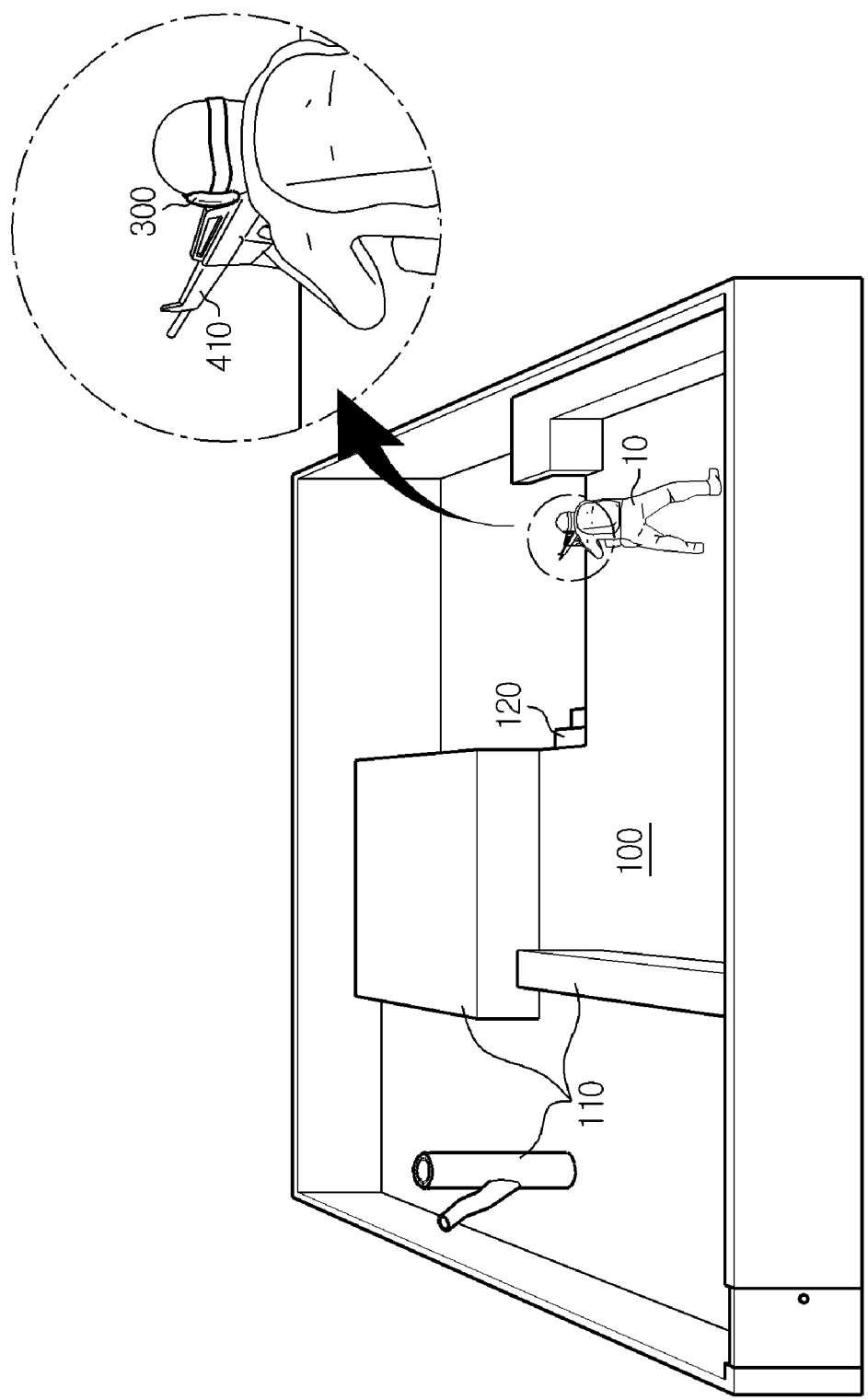
FIG. 1 is a schematic perspective view showing a configuration of a real world in a virtual reality system according to an embodiment of the present disclosure.

FIG. 1 is a schematic perspective view showing a virtual reality system according to the present disclosure in a real world, which is applied to a survival game or shooting game system.

The virtual reality system according to an embodiment of the present disclosure as depicted in FIG. 1 includes a play ground 100 with a predetermined area (for example, at least several meters in length and width) where a user 10 is actually movable, in an actual space of the real world. Here, the play ground 100 may use an existing survival game ground intactly, or the play ground 100 may also use an unhampered flatland having no or minimal obstacles 110. Even though the play ground 100 is configured as a ground with no obstacle, the present disclosure may utilize virtual objects of a virtual space, displayed on the display of the head mounted device 300, as desired, which gives fun and exercise effects close to or superior to an actual survival game. However, the play ground 100 may have an obstacle 110 at which the user 10 may hide or lean his/her body, in the nature of the survival game, and may further have a structure such as an unevenness or step 120 or a layered structure, instead of a flatland.

Figure 2:
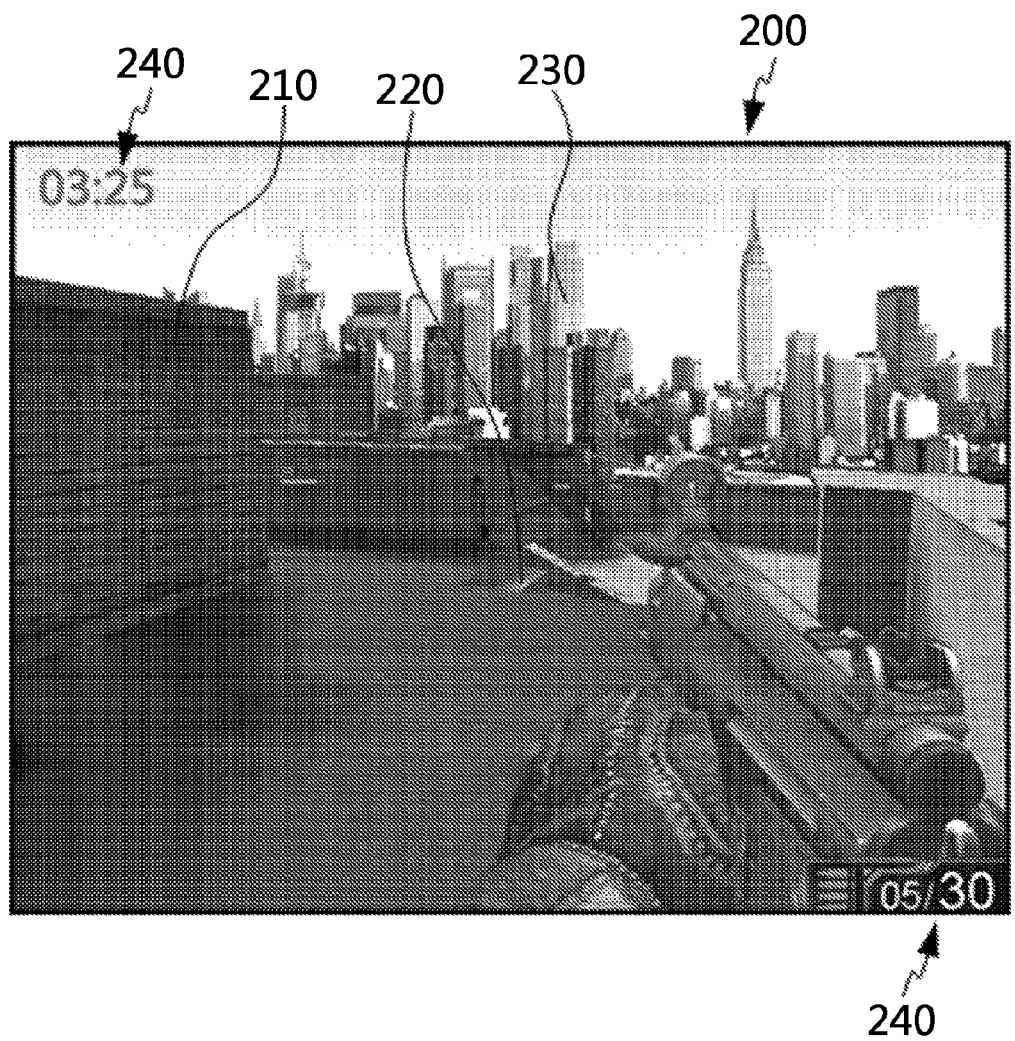
FIG. 2 is a diagram showing an example of an image of a virtual space displayed on a display in a head mounted device employed in the system of FIG. 1.

FIG. 2 shows an example of an image of a virtual space 200 displayed on the display of the head mounted device 300 when a user stands at a location and in a direction as shown in FIG. 1 in the play ground 100. Here, the virtual space 200 is constructed with the same structure as an actual space to correspond to the actual space, namely real objects (a ground structure, obstacles or facilities) 110, 120 in the play ground 100 (a method for constructing the virtual space 200 will be described later). However, as shown in FIG. 2, even though the actual space 100 and the virtual space 200 have the same basic structure, virtual objects 210, 220 are much more diverse than the real objects 110, 120, fixed virtual objects (for example, buildings 230 serving as a background in FIG. 2) not present in the actual space 100 are further present. Moreover, though not shown in FIG. 2, a moving virtual character (for example, a virtual enemy or friendly soldier) may be further present as a virtual object.

In addition, in the virtual space 200 displayed on the display of the head mounted device 300 worn by the user 10, virtual objects 210, 220 corresponding to real objects 110, 120 which are observed by the user 10 at a current location in a current direction in the actual space 100 are displayed in the current direction with a size proportional to a distance in the actual space 100 (this displaying method will be described later). In other words, if the user turns his/her head right or left or raises or lowers his/her head, virtual objects 210, 220 corresponding to real objects 110, 120 such as the ground or obstacle present in the gazing direction of the user 10 in the actual space 100 are displayed at the center of the display. Therefore, the user may move, for example naturally walk or run, while visually recognizing the ground and the virtual objects 210, 220 in the virtual space 200 as if they are the real ground and the real object 110, 120 in the actual space 100. If the user 10 moves in the play ground 100 serving as an actual space as described above, a changed current location and a changed current gazing direction of the user are calculated by means of a sensor, described later, and an image of the virtual space 200 corresponding to the changed location and direction of the user is displayed on the display.

Further, the user may enjoy a game by shooting with a gun held by his/her hand if a virtual enemy appears in the virtual space 200. Of course, the user actually holds a sensor 410 for sensing a shot. For better reality, a switch having a trigger shape and a sensor for sensing a facing direction of a gun may be attached to a toy gun so that a current facing direction of the gun is displayed as an aiming point in the virtual space 200. If so, the user aims and shoots at a virtual enemy by using the aiming point, and it is programmed that the virtual enemy falls down if the aiming point is identical to the virtual enemy, which may enhance fun and reality of the game. Further, information 240 showing a current state of the game, for example a remaining game time, the number of remaining bullets, the number of remaining enemies, the number of falling-down enemies, whether or not to be shot, a score or the like, may be displayed at a predetermined location in the image of the virtual space 200 on the display.

Figure 3:
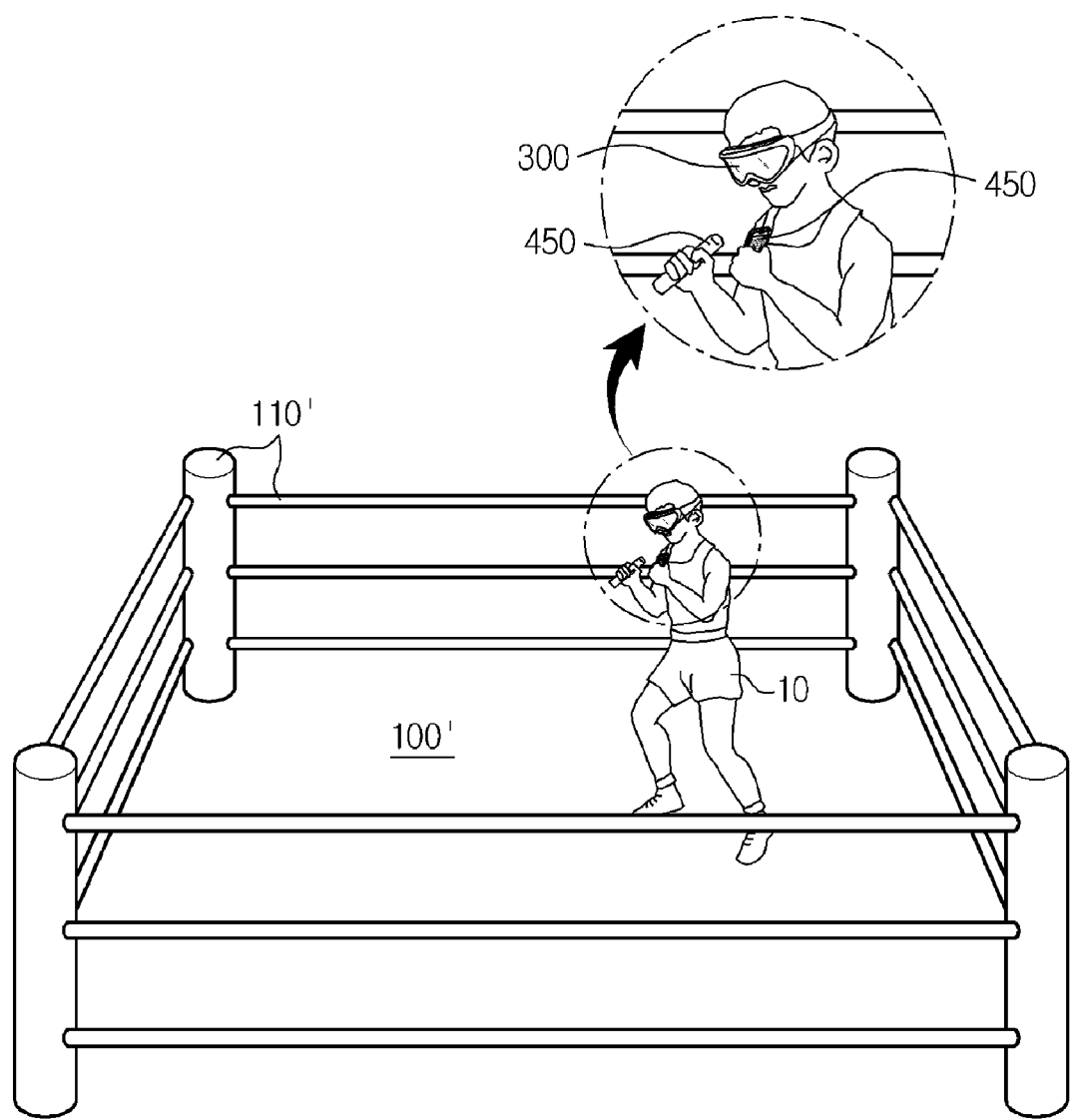
FIG. 3 is a schematic perspective view showing a configuration of a real world in a virtual reality system according to another embodiment of the present disclosure.

FIG. 3 is a schematic perspective view showing a virtual reality system in a real world according to the present disclosure, which is applied to a boxing game system.

In the virtual reality system according to the embodiment depicted in FIG. 3, a play ground 100' is implemented as a ring similar to a rectangular ring used in an actual boxing game. In this embodiment, the play ground may use an actual boxing ring, and the play ground may also use a simple flatland on which real objects 110' such as poles and ropes are implemented as virtual objects 210'.

Figure 4:
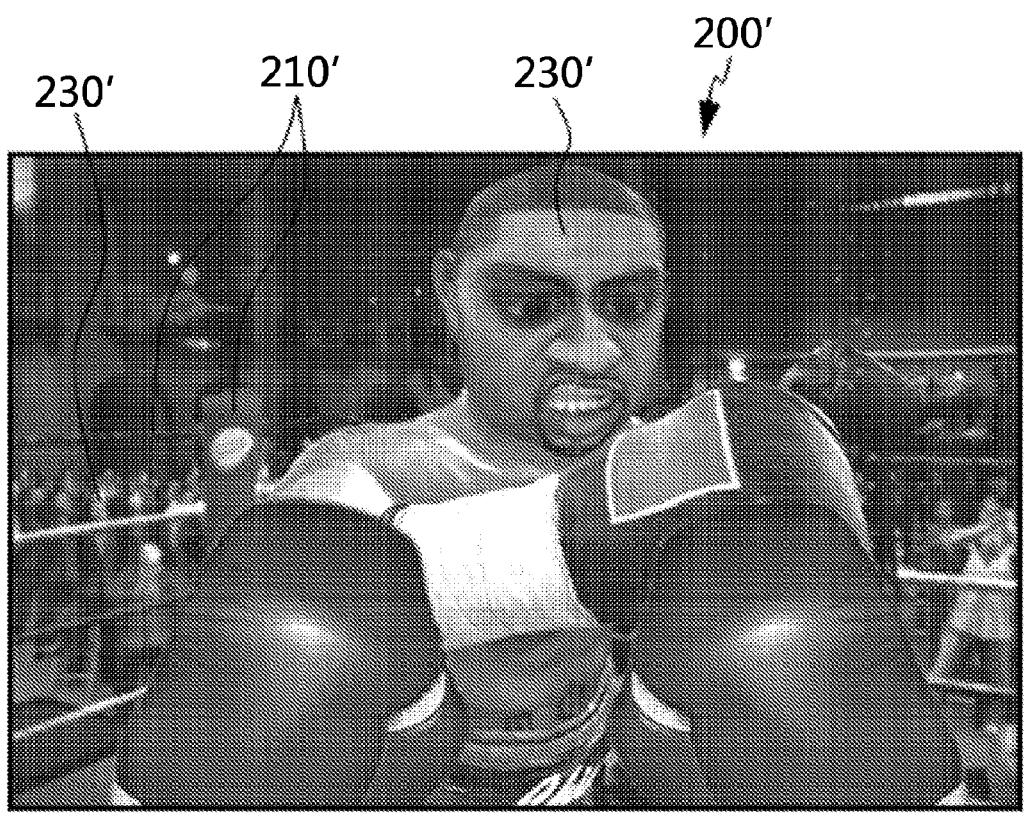
FIG. 4 is a diagram showing an example of an image of a virtual space displayed on a display in a head mounted device employed in the system of FIG. 3.

FIG. 4 shows an example of an image of a virtual space 200' displayed on the display of the head mounted device 300 when the user stands in the play ground 100'. In this example, the virtual space 200' is also constructed with the same structure as an actual space, namely corresponding to real objects 110' (a floor, poles, ropes or the like) in the play ground 100'. However, similar to the former embodiment, the virtual space 200' has the same basic structure as the actual space 100' but is much more diverse, and a moving virtual character 230' such as an opponent or spectators, which is not present in the actual space 100', may be further present in the virtual space 200'. In particular, an opponent serving as the virtual character 230' may interactively move according to a motion or movement of the user 10, and the user may select an opponent suitable for his/her level.

In addition, in this embodiment, in the virtual space 200' displayed on the display of the head mounted device 300 worn by the user 10, virtual objects 210' corresponding to real objects 110' which are observed by the user 10 at a current location in a current direction in the actual space 100' are displayed in the current direction with a size proportional to a distance in the actual space 100', and the image of the virtual space 200' is changed to be synchronized with a motion or movement of the user. Therefore, the user may naturally step or move while visually recognizing the ground and the virtual objects 210' in the virtual space 200' as if they are the real ground and the real object 110' in the actual space 100'.

However, the opponent serving as the virtual character 230' in this embodiment is a virtual object in the actual space 100'. Therefore, even though the user 10 hits the opponent 230' or is hit by the opponent 230', the user is not able to feel a hitting or hit feeling. However, similar to the former embodiment in which a virtual enemy hit by the user falls down, a punch accuracy rate or the like is calculated in consideration of a location and speed of the first of the user 10, sensed by the sensor 450, and a location of the opponent 230', and it may be programmed that an image showing that the opponent 230' falls down is displayed accordingly. In addition, similar to the former embodiment, current state information showing a hitting or hit punch accuracy rate, a current round, a remaining time or the like may be displayed at a predetermined location in the image of the virtual space 200', which may enhance fun and reality of the game.

As described above, if the virtual reality system of the present disclosure is used, the user may utilize abundant virtual objects in a virtual space while making an actual movement or motion in an actual space, which enables a new-generation entertainment system where virtual reality is combined with the real world. In particular, even though an existing game allows a user to play a game while sitting on a chair or making a motion on the spot, which results in shortage of exercise and abnormal emotion of children or youths who need suitable exercise for body development, the present disclosure allows a user to actually exercise while being entertained.

Figure 5:
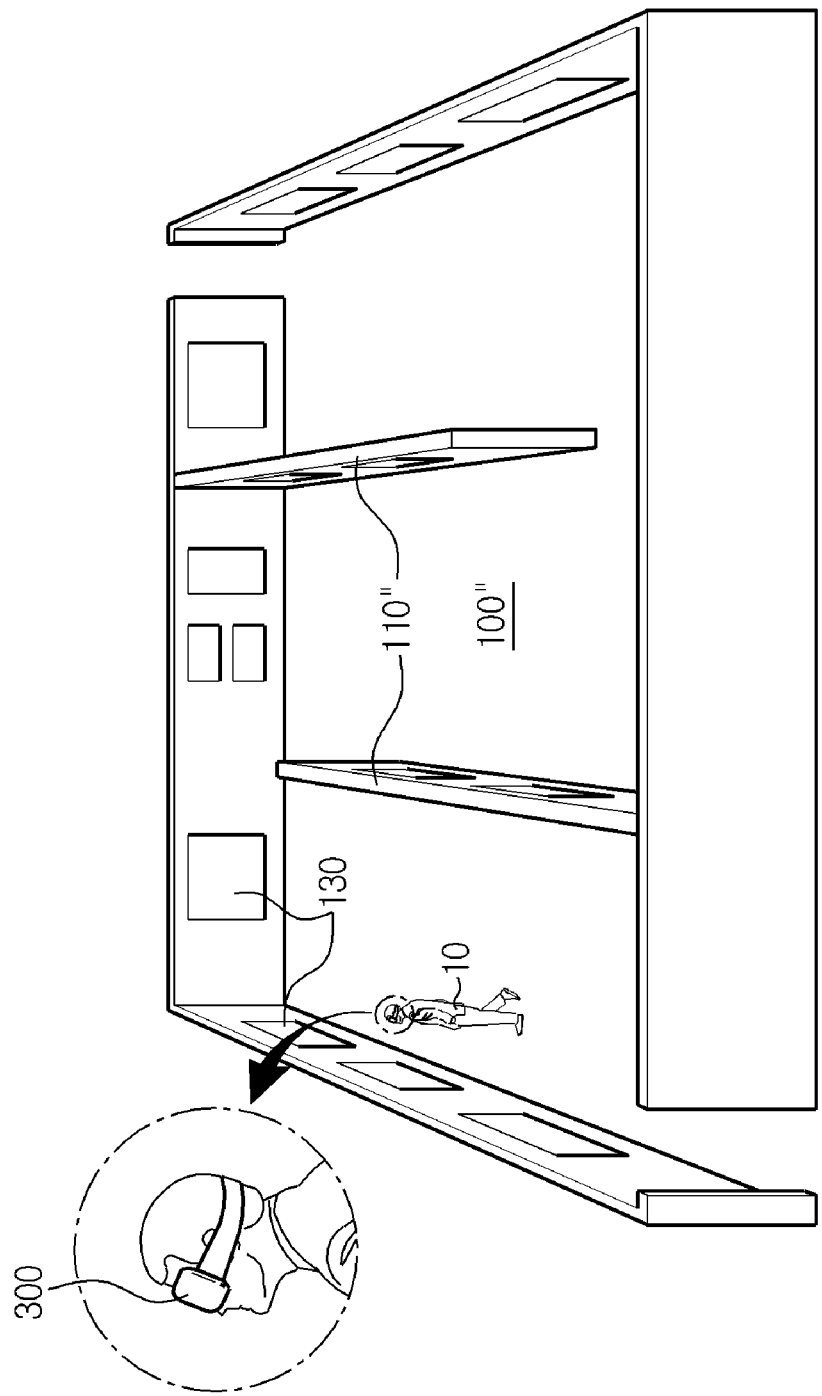
FIG. 5 is a schematic perspective view showing a configuration of a real world in a virtual reality system according to another embodiment of the present disclosure.

FIG. 5 is a schematic perspective view showing a virtual reality system in a real world according to the present disclosure, which is applied to a virtual exhibition system.

In the virtual reality system according to the embodiment depicted in FIG. 5, a play ground 100" is implemented as an exhibition center. In this embodiment, the play ground may utilize an actual exhibition center, and the play ground may also be implemented by imitating only a building structure of a popular museum or gallery. Further, different from the former embodiments, an extreme movement is not expected in this embodiment, and thus the play ground may be implemented as a simple flatland with no special border or real object 110". Meanwhile, in FIG. 5, a reference symbol 130 is a location where a virtual exhibit is to be posted in a virtual space, and this location 130 may be distinguishably present on a wall 110" in the actual play ground 100" or may not be actually present.

In this embodiment, though not shown in the figure, an image of a virtual space is displayed on the display of the head mounted device 300 according to a current location and direction of the user 10. In the virtual space, a virtual object corresponding to the wall 110" of the actual space 100" and a virtual object serving as a virtual exhibit to be posted are displayed at given locations 130. Here, the virtual exhibit may be selected by the user from collections in a popular museum or gallery. In addition, a docent or other spectators may also be displayed as virtual characters.

In addition, in this embodiment, in the virtual space displayed on the display of the head mounted device 300 worn by the user 10, virtual objects corresponding to real objects 110", 130 which are observed by the user 10 at a current location in a current direction in the actual space 100" are displayed in the current direction with a size proportional to a distance in the actual space 100", and the image of the virtual space is changed to be synchronized with a motion or movement of the user. Therefore, the user may naturally move in the exhibition center (actually, the play ground 100") and watch virtual exhibits while visually recognizing the ground and the virtual objects in the virtual space as if they are the real ground and the real object 110" in the actual space 100".

As described above, if the virtual reality system of the present disclosure is used, the user may utilize abundant virtual exhibits while actually moving in a popular museum, gallery or fairground, where the user cannot go, by means of a virtual reality system, which enables a new-generation exhibition and viewing system where virtual reality is combined with the real world beyond the limit in time and space.

Figure 6:
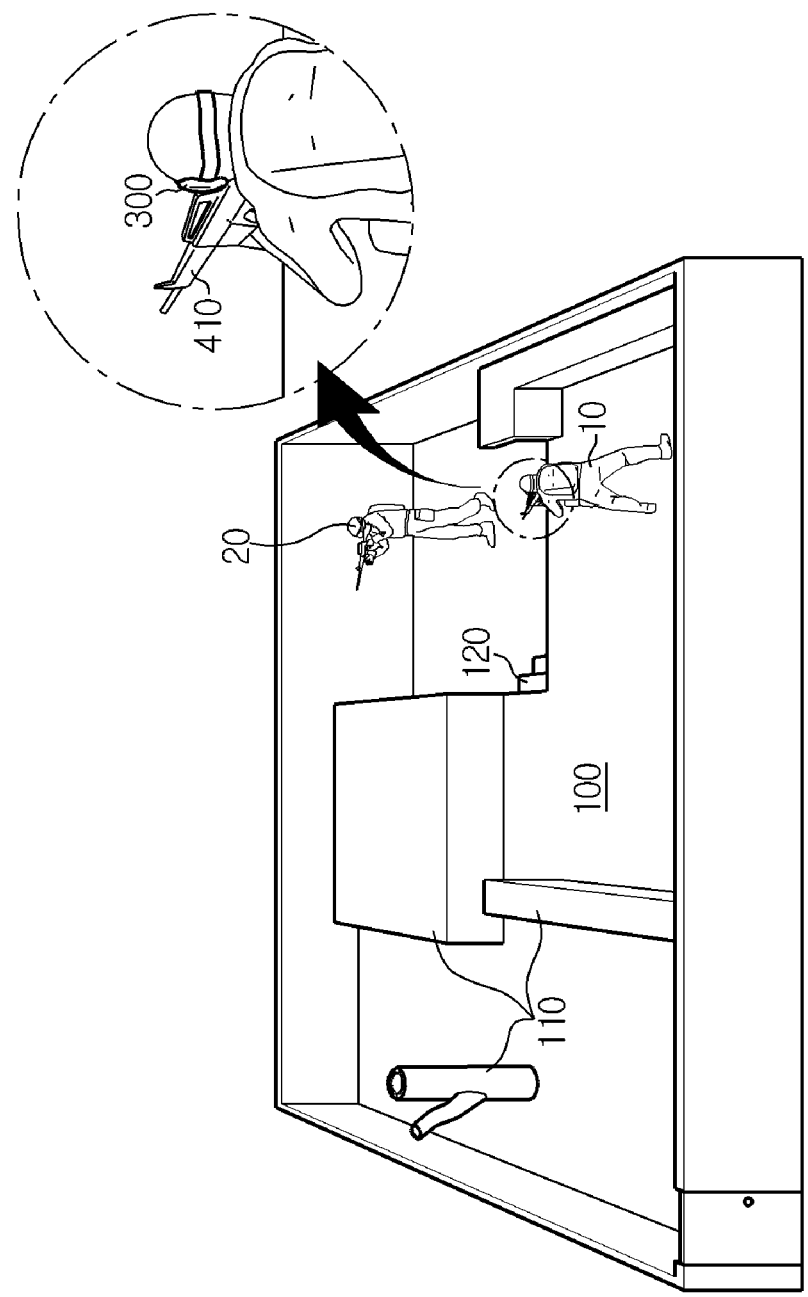
FIG. 6 is a schematic perspective view showing a configuration of a real world in a virtual reality system according to still another embodiment of the present disclosure.

FIG. 6 is a schematic perspective view showing a configuration of a real world when a virtual reality system according to the present disclosure is applied to a battle training system.

In the embodiment described with reference to FIGS. 1 through 5, one user 10 gets a feeling as if the user exists and moves in a virtual space, if the user 10 wears the head mounted device 300 and actually moves in an actual space in a play ground. In this embodiment described with reference to FIG. 6, two users 10, 20 in an actual space of a real world are located in an actual space of a play ground with a predetermined area (for example, at least several meters in length and width). In the embodiment described with reference to FIG. 1, one user 10 does a survival game or shooting game, while in this embodiment described with reference to FIG. 6, at least two users 10, 20 are divided into friendly troops and enemy troops or team up, and do battle training in the play ground 100. The play ground 100 of FIG. 6 and an actual environment of the play ground 100 are the same as described with reference to FIG. 1.

Figure 7:
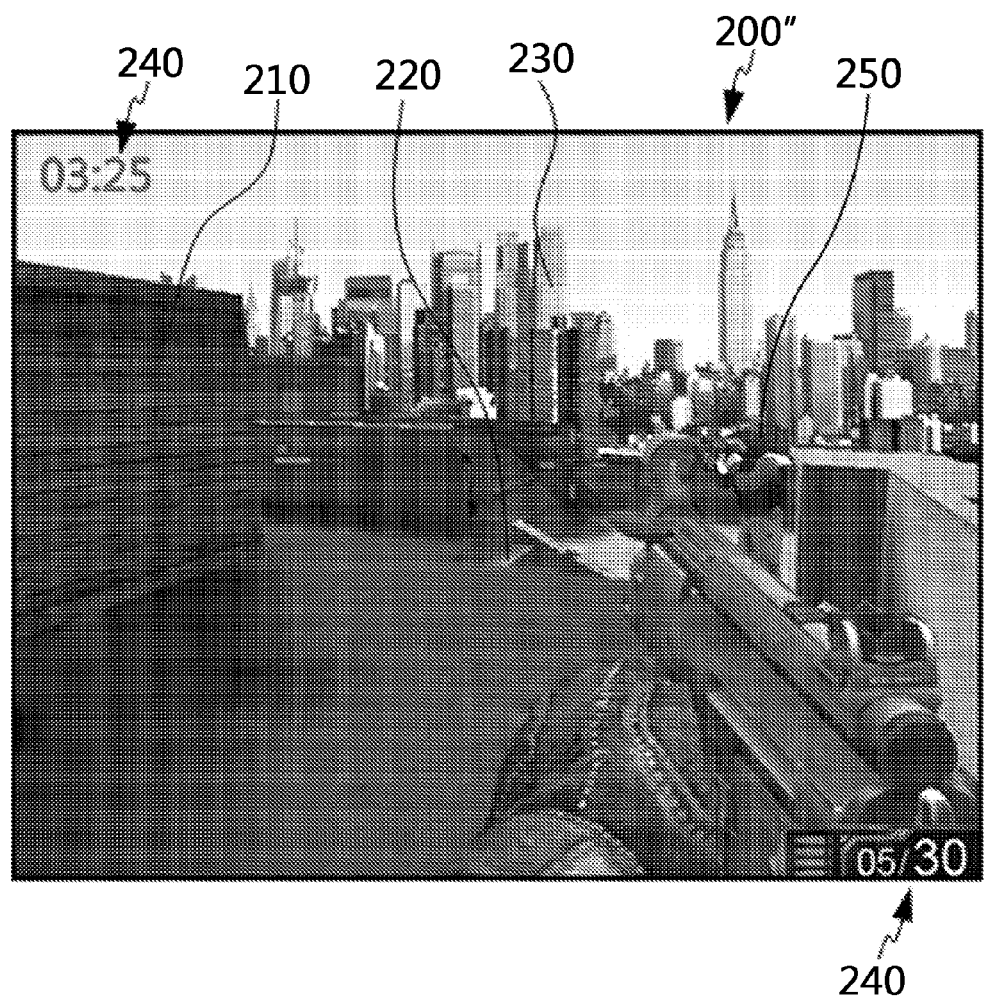
FIG. 7 is a diagram showing an example of an image of a virtual space displayed on a display in a head mounted device employed in the system depicted in FIG. 6.

FIG. 7 is a diagram showing an example of an image of a virtual space 200" displayed on the display of the head mounted device 300 when the user 10 stands at a location and in a direction as shown in FIG. 6 in the play ground 100.

In the virtual space 200" displayed on the display of the head mounted device 300 worn by the user 10, virtual objects 210, 220 corresponding to fixed real objects 110, 120 which are within the field of view of the user 10 when viewing at a current location in a current direction in the actual space 100, and a virtual object 250 corresponding to the other user 20 who is moving are displayed in the current direction with a size proportional to a distance from the user 10 in the actual space 100 (this displaying method will be described later). In other words, if the user 10 turns his/her head right or left or raises or lowers his/her head, virtual objects 210, 220, 250 corresponding to real objects 110, 120, 20, such as the ground, obstacle or another user, present in the gazing direction of the user 10 in the actual space 100 are displayed at the center of the display in response thereto. Therefore, the user 10 may move, for example naturally walk or run, while visually recognizing the ground of the virtual space 200" and the virtual objects 210, 220, 250 as if they are the real ground of the actual space 100 and the real objects 110, 120, 20.

The virtual space 200" is displayed on the head mounted device 300 of not only the user 10 but also the user 20 in the same manner as described above. That is, on the display of the head mounted device 300 of the other user 20, virtual objects corresponding to fixed real objects 110, 120 in the actual space 100 and a virtual object corresponding to the user 10 who is moving are displayed in the virtual space 200", and in this instance, the corresponding virtual objects are displayed in the virtual space 200" in the current direction with a size proportional to a distance from the user 20 in the actual space 100. If the users 10, 20 move in the play ground 100 which is an actual space, the current location and gazing direction of the users 10, 20 changed is calculated by a sensor as described below, and an image of the virtual space 200" corresponding to the changed location and direction of the users 10, 20 is displayed on the display of the head mounted device 300 of each user 10, 20.

Figure 10:
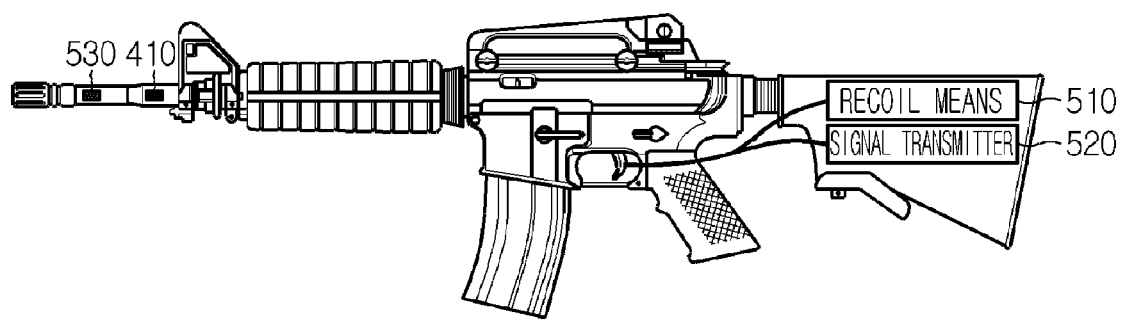
FIG. 10 is a schematic diagram showing a configuration of a gun and a vest for battle training according to an embodiment of the present disclosure.
Figure 10:
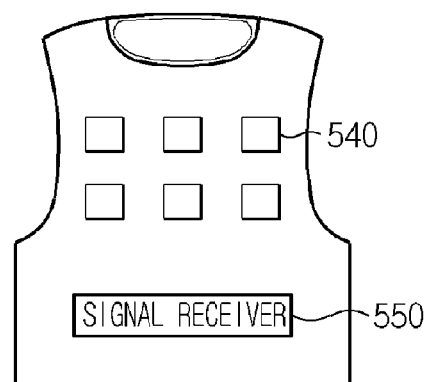

The users 10, 20 can do battle training by shooting an opponent with a gun in the virtual space 200". Alternatively, the users 10, 20 can do battle training by teaming up to shoot a virtual enemy with a gun in their hands when the virtual enemy is found in the virtual space 200". The gun held in the hands of the users 10, 20 in the real world has the same shape and weight as a real gun and is manufactured to shoot the gun by pulling the trigger in the same way as a real gun, as shown in (a) of FIG. 10. The gun may include a sensor 410 to sense a direction and motion of a gunpoint, a recoil means 510 to give recoil as if a bullet is discharged when the trigger is pulled, and a signal transmitter 520 to sense a gun shot and transmit a shooting signal. Here, the recoil means may include an air compressor and a solenoid valve. The recoil means may generate a sound of real gunshot while giving recoil when the gun is fired. The recoil means of the gun for training is generally widely known and its detailed description is omitted herein. Furthermore, the gun may have a laser pointer 530 to display an aiming location of the gunpoint. To implement more realistically, the head mounted device 300, or as shown in (b) of FIG. 10, a battle clothing (for example, a vest) worn by the users 10, 20 may have a vibration means 540. The vibration means 540 may be implemented as a piezoelectric device or a vibration motor, and when the user is shot by other user which is an enemy or a virtual enemy during battle training, the vibration means 540 generates vibration. When the vibration means 540 is mounted on the battle clothing, the battle clothing includes a signal receiver 550, and when a control signal notifying getting shot is received through the signal receiver 550, the vibration means 540 generates vibration.

A direction of the gunpoint is sensed through the sensor 410 attached to the gun, a direction in which the gun is currently facing may be displayed as an aiming point in the virtual space 200". Then, the users 10, 20 shoot on a virtual enemy or other user as an aiming point, and when the aiming point matches the virtual enemy or other user, a virtual object corresponding to the virtual enemy or other user is programmed to fall, thereby increasing fun and reality of the game. Further, information 240 showing a current state of the game, for example a remaining game time, the number of remaining bullets, the number of remaining enemies, the number of falling-down enemies, whether or not to be shot, a score or the like, may be displayed at a predetermined location in the image of the virtual space 200" on the display.

Next, a method for constructing the virtual space 200, 200', 200", which is essential to the virtual reality system according to the present disclosure, will be described.

The virtual reality system according to the present disclosure includes the play ground 100, 100', 100" which is a real world, and the users 10, 20 move, for example, walks or runs, in the play ground 100, 100', 100" without watching the actual space. Therefore, except for a case where a flatland having no border is used as a play ground, real objects 110, 120, 110' such as fixed obstacles in the play ground 100, 100', 100" should be displayed as corresponding virtual objects 210, 220, 210' in the virtual space 200, 200', 200".

Therefore, in a first step for constructing the virtual space 200, 200', 200", a frame of the virtual space 200, 200', 200" having the same structure and size as the play ground 100, 100', 100", which is an actual space, is constructed. In the step of constructing a frame of the virtual space 200, 200', 200", if the display of the head mounted device 300 respectively displays both left and right eye images so that the virtual space is displayed as a three-dimensional stereoscopic image as described above, a method for constructing three-dimensional stereoscopic image data may be used.

In detail, the play ground 100, 100', 100" is scanned to obtain depth information of the actual space and thus get a depth map therefrom. A most general method for obtaining depth information of the actual space is a stereo matching method which uses images obtained by scanning the play ground 100, 100', 100" with two cameras. In the stereo matching method, disparity information between pixels corresponding to the same object in two images is obtained to get depth information of objects (real objects). As another general method for obtaining depth information of the actual space, a distance between objects in the actual space may be directly measured to obtain a depth map of the actual space. In other words, the play ground 100, 100', 100" is scanned by using a depth camera which emits infrared ray or optical signals, and a distance between objects, namely depth information, is from a phase difference of signals reflected and returned.

After the depth map of the play ground 100, 100', 100", which is an actual space, is obtained in this way and a frame of the virtual space is constructed, objects present in the frame (they are still real objects) are corrected and rendered, thereby generating virtual objects which correspond to the real objects but are more diverse and varying.

Subsequently, pure virtual objects 230, 230' not present in the play ground 100, 100', 100" which is an actual space are produced. These virtual objects include background buildings (230 in FIG. 2) or virtual exhibits fixed in the virtual space 200, 200', 200", and moving virtual characters (230' in FIG. 4). These pure virtual objects are produced through a general designing work. In addition, the virtual object, particularly the moving virtual character, is programmed to move in response to a behavior or motion of the users 10, 20. This is performed through a general interactive game programming work.

The image data of the virtual space configured as above is stored in the memory of the control unit together with a game program or an exhibition program, thereby completely preparing the virtual space which is useable in the virtual reality system according to the present disclosure.

Subsequently, detailed components of the virtual reality system according to the present disclosure as well as means and method for configuring the system of the present disclosure will be described in detail with reference to FIG. 8.

Physical components of the virtual reality system according to the present disclosure are generally classified into play ground 100, 100', 100", a head mounted device 300, at least one sensor 400, and a control unit 500. Here, the play ground 100, 100', 100" has already been described above, and the following description will be focused on other components.

Meanwhile, the head mounted device 300, at least one sensor 400, and the control unit 500 may not be physically divided from each other, but as described later, they may be integrally included in or attached to a single device. In other words, these components are logically distinguished.

The head mounted device 300 is worn by the users 10, 20 to surround both eyes, and a display for displaying an image of the aforesaid virtual space 200, 200', 200" is provided in the head mounted device 300 at a location corresponding to both eyes of the user. Therefore, if the users 10, 20 wear the head mounted device 300, the users are not able to see real objects in the real world other than the image displayed on the display. Furthermore, the head mounted device 300 includes at least one processor and memory, and an operating system, a graphic module (instruction set), and a game program (instruction set) may be installed in the memory as software element. The operating system may be, for example, Darwin, iOS, RTXC, LINUX, UNIX, OS X, WINDOWS or VxWorks, or an embedded operating system such as Android, and includes software that controls and manages general system task (for example, memory management, storage device control, and power management). The graphic module includes many known software elements for providing and displaying graphics on the display of the head mounted device 300. The term "graphics" include, without limitation, text, web page, icon (for example, user interface element including soft key), digital image, video, animation, and 2D/3D data, and includes all objects that can be displayed to users.

The display may be divided into a left eye display and a right eye display provided at locations respectively corresponding to both left and right eyes of the users 10, 20. If so, the left eye display displays a left eye image which is an object image seen by the left eye of the users 10, 20, and the right eye display displays a right eye image which is an object image seen by the right eye of the users 10, 20, respectively. Therefore, without any special means such as special glasses for watching a three-dimensional image by means of a shutter or filter or a lenticular sheet attached to a surface of the display, a three-dimensional display may be provided conveniently.

Furthermore, the head mounted device 300 has a communication module embedded therein to transmit and receive data through communication with the control unit 500. The communication module transmits and receives electromagnetic waves. The communication module converts electrical signals to electromagnetic waves or vice versa, and makes communication through the electromagnetic waves. The communication module includes, for example, an antenna system, a RF transceiver, one or more amplifiers, a tuner, one or more oscillators, a digital signal processor, a CODEC chipset, a subscriber identity module (SIM) card, and memory, and may include known circuit that is not limited thereto but performs functions thereof. The communication module can make communication via a wireless network such as cellular phone network, wireless LAN (Local Area Network) and/or MAN (metropolitan area network), and a near-file wireless communication. The wireless communication may use any of multiple communication standards, protocols and technology including, but not limited to, GSM (Global System for Mobile Communication), EDGE (Enhanced Data GSM Environment), WCDMA (wideband code division multiple access), CDMA (code division multiple access), TDMA (time division multiple access), Wi-MAX, Bluetooth, zigbee, NFC (Near Field Communication), or other suitable communication protocol including communication protocol not developed at the time of filing the application. Furthermore, the communication module can make communication via a wired network such as HDMI cable, USB cable or wired LAN (Local Area Network).

Such a head mounted device 300 is easily available and widely known in the art, and thus its basic configuration and principle will not be described in detail here.

Meanwhile, the head mounted device 300 may further include an earphone and/or microphone, like a general headset, to give an audio effect (sound) to the users 10, 20 in addition to a visual effect or to receive a voice of the users 10, 20 so that the users 10, 20 may make a conversation with a virtual character or inputs a command to the system by voice.

The sensor generally designated by a reference symbol 400 may be configured in various ways according to a specific application, but basically a sensor for sensing a current location and a facing direction (a direction in which the user gazes) of the users 10, 20 in the play ground 100, 100', 100", and recognizing the shape and motion of the users 10, 20.

Figure 8:
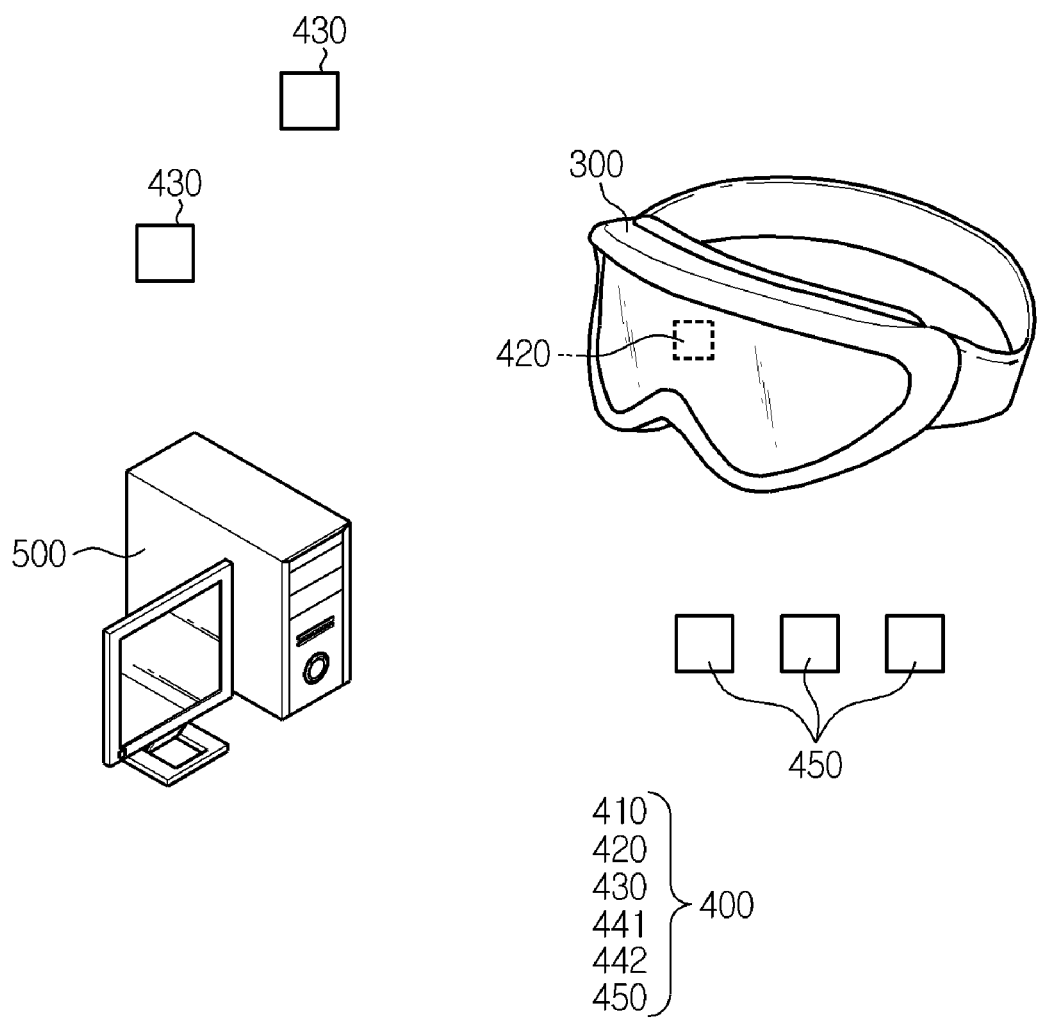
FIG. 8 is a schematic diagram showing a configuration of a virtual reality system according to an embodiment of the present disclosure.

The sensor 410 shown in FIG. 8 is a sensor capable of sensing a shot used in the embodiment of FIGS. 1 and 6 and sensing a facing direction of a gun. For the corresponding sensor 410, an acceleration sensor or a gyro sensor as described below may be used.

The sensor 450 shown in FIG. 8 is a motion sensor. The motion sensor 450 may be implemented using the acceleration sensor or gyro sensor described above. The motion sensor 450 may sense a hand motion or a physique motion of the user 10 if the user 10 grips the sensor as shown in FIG. 3 or wears the sensor on a plurality of joints, and the sensed motion of the user 10 may be reflected to change a behavior of a virtual character (for example, the virtual opponent player 230' in FIG. 4). Furthermore, the motion sensor 450 may be worn on a plurality of joints of the users 10, 20 to recognize shape of the users 10, 20.

The sensor 420 shown in FIG. 8 is an acceleration sensor or a gyro sensor and is used for sensing a current location and direction of the user. The acceleration sensor or gyro sensor is embedded in or attached to the head mounted device 300. The acceleration sensor senses an acceleration of the head mounted device 300 when the head mounted device 300 moves according to a motion of the user 10, 20, and a current location and a facing direction of the user 10, 20 in the play ground 100, 100', 100" may be calculated by using the acceleration sensor. In detail, if the head mounted device 300 moves, the acceleration sensor 420 may sense its acceleration, decompose the acceleration into x-, y- and z-axis components, and generate signals therefor. If they are integrated, velocities in x-, y- and z-axis directions may be calculated, and if they are integrated again, a current location of the head mounted device 300, namely coordinates on a x-, y- and z-axes based on an origin point (an initial location, for example, an entrance of the play ground 100, 100" in FIGS. 1 and 5 and a specific corner of the boxing ring of the play ground 100' in FIG. 3) may be obtained. In addition, since the acceleration and velocity are vectors having a magnitude and direction, if a movement history from the origin point to the current location is traced, the direction in which the head mounted device 300 is currently facing, namely the direction in which the user gazes, can be calculated. Meanwhile, the gyro sensor measures an angular momentum or an angular velocity of the head mounted device 300 rotated based on the rotation axes (x-, y-, and z-axes) and outputs them as electric signals. Similar to the acceleration sensor, the gyro sensor also allows a current location and a facing direction of the user, namely the head mounted device 300, to be calculated.

For this, when the user 10, 20 stands at the origin point to face the front or a predetermined direction, an initializing process, namely a calibration process for harmonizing a coordinate axis of the actual space with a coordinate axis of the acceleration sensor or gyro sensor 420, should be performed. This initializing process and the user current location and direction calculating process are performed by the control unit 500 using a signal from the acceleration sensor or gyro sensor 420.

The sensor 430 shown in FIG. 8 is a camera sensor. The camera sensor 430 can sense a current location and direction of the user 10, 20, recognizes the shape and motion of the user 10, 20, and is used for constructing a virtual space. At least one camera sensor 430 may be installed at a specific location in the play ground 100, 100', 100" or the head mounted device 300, and preferably, a plurality of camera sensors is installed for accurately sensing a location and direction in consideration of dead zones.

The camera sensor 430 includes a depth camera, a color camera, and a microphone. The depth camera is a camera that measures the depth of an object, and measures depth information and outputs a depth image. Preferably, the depth camera is a camera that measures depth information by an infrared pattern. The depth camera includes an infrared ray sender and an infrared ray receiver, and if infrared rays sent from the sender reflect off an object, the receiver receives the reflected infrared rays and measures the depth of the object. The color camera is a general RGB camera and outputs a color image of an object. The microphone is a device that receives a voice and converts it into an electrical signal.

The camera sensor 430 photographs an image within its vision field and sends the image to the control unit 500. If so, the control unit 500 recognizes the user and the head mounted device 300 from the image received from the camera sensor 430 and calculates a current location of the head mounted device 300 in the play ground 100, 100', 100" from the location, size and shape in the image. This process is performed using an image recognition algorithm, and the image recognition algorithm is already widely known in the art and thus not described in detail here. A typical example of measuring a distance between real objects includes a triangulation analysis method of stereo images.

The camera sensor 430 may include a laser detection camera. The laser detection camera may be utilized in the battle training system. The laser detection camera may be a CCD camera having an attached filter to recognize a laser irradiated from a gun possessed by the user 10, 20. An image captured by the laser detection camera is transmitted to the control unit 500, and the control unit 500 analyzes an impact point of the laser or coordinates of a trajectory by analyzing the image captured by the laser detection camera. The control unit 500 determines that a virtual enemy object or a real user to fight with was shot when a location of the virtual enemy object or the real user to fight with is matched with the impact point of the laser or the coordinates of the trajectory.

Figure 9:
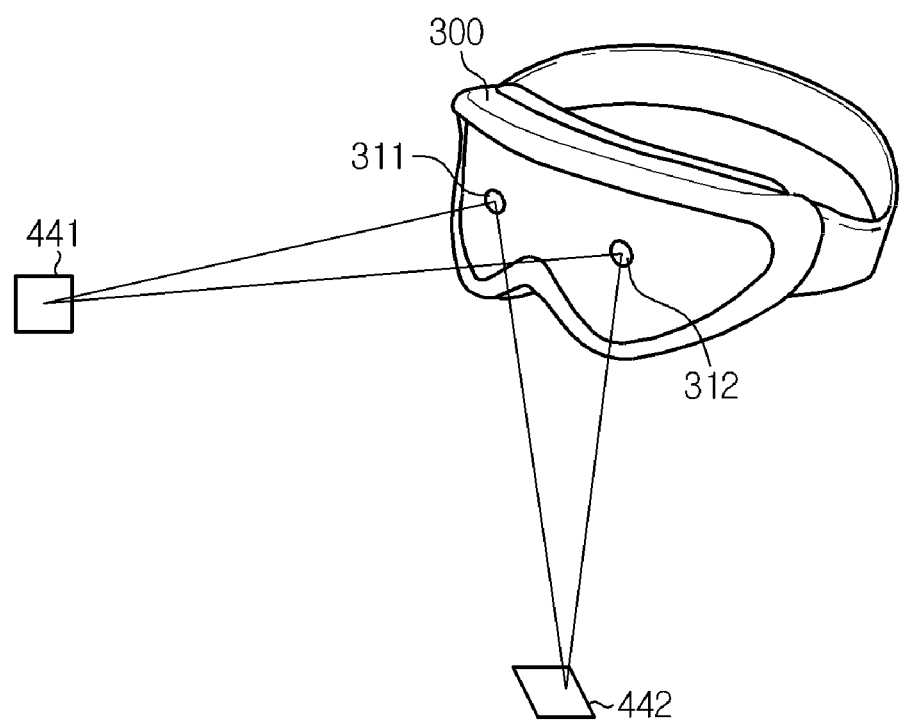
FIG. 9 is a diagram showing another example of a sensor employed in the virtual reality system according to an embodiment of the present disclosure.

As another example of the sensor for sensing a current location and direction of the user, as shown in FIGS. 8 and 9, an emission element 311, 312 mounted to the head mounted device 300 to emit an electromagnetic wave of a specific wavelength (typically, infrared ray) and at least two detection element 441, 442 installed at predetermined locations in the play ground 100, 100', 100" to detect the electromagnetic wave (infrared ray) emitted from the emission element 311, 312 may be used. Here, the emission element may include two emission elements 311, 312 respectively mounted to locations on an outer surface of the head mounted device 300, which approximately correspond to both eyes of the user. In addition, two detection elements 441, 442 respectively detect electromagnetic waves emitted from two emission elements 311, 312 and respectively sense locations of two emission elements 311, 312 therefrom. If so, the control unit 500 may receive the signals from the detection element 441, 442 to calculate locations of two emission elements 311, 312, calculate a center point of the calculated locations of two emission elements 311, 312 as a current location of the head mounted device 300, and calculate a direction of a perpendicular bisector at the locations of the two emission elements 311, 312 as a current facing direction of the head mounted device 300, namely a direction in which the user is gazing.

Among the aforesaid sensors 410, 420, 430, 441, 442, 450, any one of the sensors 420, 430, 441, 442 for calculating a current location and a gazing direction of the user may be independently utilized, but two or more kinds of sensors may also be combined to enhance the sensing accuracy, depending on applications.

If the actual location and the facing direction (the gazing direction) of the user 10, 20 in the actual space 100, 100', 100" is calculated using the sensor 420, 430, 441, 442, virtual objects in the virtual space 200, 200', 200" located in the current gazing direction from the current location, which corresponds to the actual location and the facing direction in the actual space 100, 100', 100", are displayed on the display of the head mounted device 300, so that the user 10, 20 may feel as if the user is actually present in the virtual space 200, 200', 200" corresponding to the actual space 100, 100', 100". In addition, if the user moves in the actual space 100, 100', 100", the user may feel as if the user also moves in the virtual space 200, 200', 200".

In the virtual exhibition system depicted in FIG. 5, the user 10 just walks and views virtual exhibits. Therefore, the sensor 420, 430, 441, 442 which calculates an actual location and a facing direction of the user 10 in the actual space 100, 100', 100", may be sufficient as the sensor 400 for the system of FIG. 5. However, in the systems depicted in FIGS. 1 to 4 and 6, the user 10 should make active motions (a shooting motion in FIGS. 1 and 6, a punching motion in FIG. 3, or the like) in addition to simple viewing. Therefore, these systems further require the sensors 410, 450 for sensing a direction and motion of the gunpoint and a behavior or motion of the user as described above.

The control unit 500 may be generally implemented as a computer or a server apparatus separated from the user 10, 20 and installed in or out of the play ground 100, 100', 100". Here, the computer or server apparatus means an information processing device including at least a processor, a memory, an I/O interface, and a communication circuit. More specifically, the control unit 500 may include memory, a memory controller, at least one processor, a peripheral interface, an input/output (I/O) subsystem, a display device, an input device and a communication circuit. The components of the control unit 500 make communication through one or more communication buses or signal lines, and many components include one or more signal processing and/or application specific integrated circuit, and may be implemented as hardware, software, or combination of hardware and software.

The memory may include high speed random access memory, and may include non-volatile memory such as one or more magnetic disk storage device and flash memory device, or other non-volatile semiconductor memory device. In some embodiments, the memory may further include a network attached storage device that is accessed by a storage device far away from at least one processor, for example, via a communication network (not shown) such as a communication circuit, LAN (Local Area Network), WLAN (Wide LAN), SAN (Storage Area Network), or suitable combinations thereof. Access to the memory by the component such as the processor and the peripheral interface may be controlled by the memory controller.

The peripheral interface connects the input/output peripheral device of the control unit 500 to the processor and the memory. The at least one processor executes the instruction set stored in various software programs and/or memory to perform many functions for the control unit 500 and process data. In some embodiments, the peripheral interface, the processor and the memory controller may be implemented on a single chip, or as separate chips. The at least one processor may control the receipt and manipulation of input and output data between the components of the control unit 500, for example, using the instructions found in the memory. An operating system and a virtual reality operating program (instruction set) may be installed in the memory.

The control unit 500 stores information and data in relation to the virtual space of the virtual reality system according to the present disclosure in a memory along with an operating program or the like, and executes the operating program by means of the processor so that the user 10, 20 may enjoy the virtual reality system according to the present disclosure. In detail, the control unit 500 receives signals from the sensor 400 to calculate an actual location and a facing direction of the user 10, 20 in the play ground 100, 100', 100", and controls the head mounted device to display an image of the virtual space 200, 200', 200", observed at the actual location and in the facing direction of the user 10, 20, on the display of the head mounted device 300. In addition, the control unit 500 displays virtual objects such as virtual characters or virtual exhibits on the display according to the operating program, senses a motion of the user 10, 20 by receiving signals from the sensor 400, and displays an image of the virtual object changed corresponding thereto on the display.

If the control unit 500 is implemented using a separated computer or server apparatus as described above, the I/O interface of the control unit 500 for communication with the head mounted device 300 or the sensor 400 may be implemented by means of wireless communication in order to ensure free movement of the user 10. The wireless communication may utilize wireless long-range communication, wireless near-field communication, infrared communication or the like, widely known in the art.

In addition, if high-speed mass data transmission is impossible in the wireless communication, the control unit 500 may be implemented as a portable computer possessed or worn by the user 10, 20 (for example, a portable computer put into a backpack and carried on the user's back). In this case, the control unit 500, the head mounted device 300 and sensor 400 may be connected by means of wires which allows high-speed mass data transmission.

Further, the control unit 500 may also be implemented as a smart phone or a tablet PC possessed by the user. In other words, the smart phone including a memory, a processor, and an I/O interface may be substantially regarded as a computer, and this may serve as a control unit for controlling a virtual reality system composed of a relatively small-capacity program and data, in some applications. In this case, an acceleration sensor or gyro sensor recently included in the smart phone may be utilized. In the embodiment of FIG. 3, the user 10 may do boxing, holding the smart phone as the sensor 450, and analyze a motion of the user 10 using the acceleration sensor or gyro sensor embedded in the smart phone. In addition, the virtual reality system of the present disclosure may be implemented by connecting the camera sensor 430, the sensor 410 installed in the gun or the head mounted device 300 by means of a wired or wireless interface and installing a necessary application program in the smart phone.

In addition, other physical components of the virtual reality system according to the present disclosure may include an earphone, a speaker, a microphone, an air blower, a sprayer or the like, as described above. In addition, the user may wear a special cloth to which piezoelectric elements or vibration motors are attached as described above so that the user may feel a hit feeling in a fighting or combat game such as a shooting game or a boxing game.

Next, the operation of a method for enjoying the virtual reality system of the present disclosure, namely a method in which one user 10 alone enjoys the virtual reality system, will be described.

First, the user 10 wears the head mounted device 300 and necessary sensors 400, and before starting a game or viewing in earnest, the calibration process described above is performed. In other words, if the user stands toward the front or in a predetermined direction at an entrance of the play ground 100, 100', 100" or any other given location for a predetermined time, the control unit 500 harmonizes the coordinate axis of the actual space 100, 100', 100" with the coordinate axis of the sensor 400.

If the user 10 starts a game or viewing in earnest, namely if the user 10 makes a movement or motion in the play ground 100, 100', 100", the control unit 500 calculates an actual location and a facing direction (or, a gazing direction) of the user, namely the head mounted device 300, from signals input from the sensor 400. Subsequently, if the actual location and direction of the head mounted device 300 is calculated, a virtual space image observed at the same location and in the same direction in the virtual space 200, 200' having the same structure and size is generated and displayed on the display of the head mounted device 300. This process for generating an image of the virtual space is identical to a three-dimensional animation producing process, in which a virtual camera is disposed at the above location to face the above direction in the constructed virtual space and an image of the virtual space within a vision field of the virtual camera is captured. At this time, if the system displays a three-dimensional image, a left eye image and a right eye image are captured respectively from two virtual cameras spaced apart as much as a distance between left and right eyes. In addition, a magnification of the virtual camera is adjusted so that a size of an object observed by the eyes of a human in the actual space at the same location and in the same direction becomes identical to a size of the virtual object in the image captured by the virtual camera. In addition, when the image of the virtual space is captured, illumination effects may be suitably applied so that the virtual space may be decorated more diversely.

The captured image of the virtual space observed at the current location and in the current direction of the user 10 is displayed on the display of the head mounted device 300. At this time, sound effects or the like may be added to enhance the immersion and reality of the virtual space.

After that, in real time or whenever a motion of the head mounted device 300 is sensed, a process of calculating an actual location and a facing direction of the head mounted device 300 and a process of generating an image of the virtual space 200, 200' corresponding thereto and displaying the image on the display are repeated, so that a motion or movement of the user 10 in the play ground 100, 100', 100" is synchronized with a motion or movement in the virtual space 200, 200'.

Meanwhile, according to a progression of a game program or the like and a behavior or motion of the user 10 sensed by the sensor 400, a virtual character may appear in the virtual space and is interactively changed according to the behavior or motion of the user.

By doing so, in the present disclosure, the immersion in a virtual space can consist with the actual movement in an actual space, and the immersion and reality may be maximized.

Next, the operation of another method for enjoying the virtual reality system according to the present disclosure, namely, a method in which at least two users 10, 20 enjoy the battle training system, is described.

First, the users 10, 20 wear the head mounted device 130 and the sensor 400 for sensing a location and a gazing direction, and before starting a game or viewing in earnest, the calibration process described above is performed. That is, if at least two users 10, 20 stand toward the front or in a predetermined direction at an entrance of the play ground 100 or any other given location for a predetermined time, the control unit 500 harmonizes the coordinate axis of the actual space 100 with the coordinate axis of the sensor. In this instance, as the at least two users 10, 20 do battle training together, each user 10, 20 stands at non-overlapping locations. In this instance, the two users 10, 20 may team up or may be opponents to fight against.

When a location and a gazing direction of the users 10, 20 are analyzed using the camera sensor 430, the aforesaid process may not be performed. As the virtual space is constructed with the same structure and size as the play ground which is the actual space, a location and a gazing direction of the users 10, 20 in the play ground may be analyzed through analysis of images captured by the camera sensor 430. Meanwhile, the two users 10, 20 may be each located in two play grounds distant from each other. In this case, the locations at which the users 10, 20 stand initially may be non-overlapping locations in the play ground. That is, if the user 10 stands at a first designated location (X1, Y1) in the first play ground, the user 20 stands at a second designated location (X2, Y2) in the second play ground. Even in case that a location and a gazing direction of the user 10, 20 is analyzed using the emission elements and the detection elements 311, 312, 441, 442, as the location of the detection elements 441, 442 is a known fixed location, an initial calibration process may be unnecessary, and in the same way as the camera sensor 430, the locations at which the users 10, 20 stand initially be non-overlap locations in the play ground.

Meanwhile, each user 10, 20 is photographed using the camera sensor 430 and the shape of each user 10, 20 is analyzed to generate virtual objects corresponding to the users 10, 20. A method for forming virtual objects corresponding to each user 10, 20 is performed in the same manner as the method for constructing a virtual space as described previously, and scans each user 10, 20 to obtain depth information, analyzes the shape of each user 10, 20 using the depth information, and generates a corresponding 3D virtual object. In this instance, the shape of the users 10, 20 may be analyzed through the motion sensor 450 installed at each joint of the users 10, 20 other than the camera sensor 430.

If battle training starts in earnest, namely, if the users 10, 20 make a movement or motion in the play ground 100, the control unit 500 calculates an actual location and a facing direction (or, a gazing direction) of the user, namely the head mounted device 300, from signals input from the sensor (for example, the acceleration sensor or gyro sensor 420, or the camera sensor 430 or the emission element and the detection device 311, 312, 441, 442).

Subsequently, when the actual location and direction of the head mounted device 130 is calculated, the control unit 500 generates an image of the virtual space observed at the same location and direction in the virtual space 200" having the same structure and size, and transmits it to the head mounted device 300 to display it on the display of the head mounted device 300.

The virtual space 200" observed at the current location and the gazing direction of each user 10, 20 is displayed on the display of the head mounted device 300 of each user 10, 20. In this instance, the actual space observed at the current location and the gazing direction of each user 10, 20, namely, the virtual objects 210, 220 corresponding to the real objects 110, 120 fixed in the play ground 100 are display in the virtual space 200" in the current direction with a size proportional to a distance in the actual space. Furthermore, when other user 10, 20 is present in the actual space observed at a current location and a gazing direction of each user 10, 20, the virtual object 250 corresponding to other user 10, 20 is displayed in the virtual space 200" in the current direction with a size proportional to a distance in the actual space. As a current location and a gazing direction of each user 10, 20 in the actual space is calculated as described previously, when a second user is present in a gazing direction of a first user in the actual space and makes a movement, a virtual object corresponding to the second user is displayed in synchronization with the real motion in the virtual space 200" displayed on the display of the first user. In this instance, the immersion or reality in the virtual space can be enhanced using sound effects.

After that, in real time or whenever a motion of the user 10, 20 is sensed, the control unit 500 calculates an actual location and a facing direction of the head mounted device 300, generates an image of the virtual space 200" corresponding thereto and displays the image on the display of the head mounted device 300 repeatedly, so that a motion or movement of the user 10, 20 in the play ground 100 is synchronized with a motion or movement in the virtual space 200". Meanwhile, according to a progression of a battle training program and a behavior or motion of the user 10, 20, a virtual character may appear in the virtual space, and is interactively changed according to the behavior or motion of the user.

Furthermore, when the user 10, 20 detects an enemy in the virtual space 200" and pulls the trigger of the gun the user actually possesses, the recoil means of the gun generates recoil as if a bullet is actually discharged, and the signal transmitter provided in the gun wirelessly transmits a shooting signal to the control unit 500. The control unit 500 that received the shooting signal analyzes a direction of the gunpoint by analyzing the signal received from the sensor 410 installed in the gun, and when the direction of the gunpoint matches the location of the enemy, determines that the corresponding enemy was shot. Alternatively, the control unit 500 that received the shooting signal may analyze a trajectory of laser emitted from the gun by analyzing an image received from the camera sensor 430, and when the trajectory of laser matches the location of the enemy, determine that the corresponding enemy was shot. The control unit 500 displays that the enemy object falls in the virtual space 200". Furthermore, when the enemy is a real user and the corresponding user wears a vest including a vibration means, the control unit 500 transmits a vibration control signal to the vest of the user to allow the corresponding user to feel himself/herself that he/she was shot. Further, the control unit 500 may display information 240 showing a current state of the battle, for example, information such as the number of remaining bullets, the number of remaining enemies/friendly soldiers and the number of falling-down enemies/friendly soldiers, at a predetermined location in the image of the virtual space 200".

By doing so, according to the present disclosure, the effect of battle training can be maximized by making immersion in a virtual space and a movement in an actual space compatible and maximizing immersion and reality.

Meanwhile, since humans have very developed sight, a three-dimensional display technique is inferior to the human sight even though it has been greatly developed recently. Therefore, in an embodiment of the present disclosure, an eye tracking technique is utilized to enhance the reality of the virtual space further.

Figure 11:
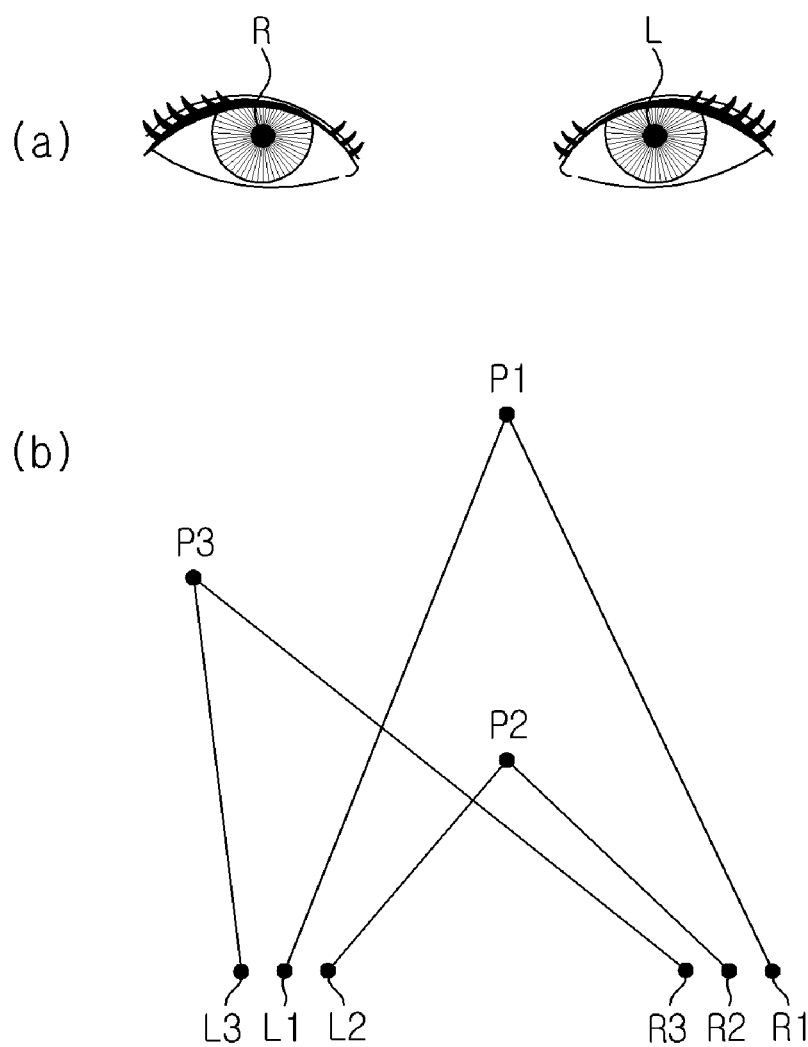
FIG. 11 is a diagram for illustrating an eye tracking function applied to the virtual reality system according to an embodiment of the present disclosure.

The eye tracking technique detects pupils L, R of a left eye and a right eye as shown in (a) of FIG. 11, and calculates a gazing point, which is gazed by a user, therefrom as shown in (b) of FIG. 11.

When seeing an object, a human generally turns his/her head toward a gazing point so that the gazing point is put into a front center of the face, namely a center of the vision field. However, a human may also observe a gazing point P3 at a corner of the vision field just by rolling his/her eyeballs without turning his/her head. At this time, the pupils L, R of both left and right eyes move respectively from the centers of both eyes toward the gazing point P3 (see L3, R3).

Further, even though the gazing direction is identical, different gazing points P1 and P2 may be set when a human observes an adjacent object and a distant object. In other words, a distance between the pupils of both eyes is closer when the gazing point is close (P2) in comparison to the case when the gazing point is far (P1) (the distance decreases from L1 and R1 to L2 and R2). From the nature of the human sight, a current gazing point may be found by detecting locations of the pupils L, R of both left and right eyes.

In addition, the eye of a human adjusts a focusing distance of the eye lens according to a distance to the gazing point by controlling the eye lens thinner when seeing a distant point and controlling the eye lens thicker when seeing a close point, and a focus of an image focused on the retina changes accordingly.

Therefore, in an embodiment of the present disclosure, a gazing point of the user 10, 20 is calculated, and when an image of the virtual space is generated from a virtual camera of the virtual space, an image having a focus at the calculated gazing point of the user is generated and displayed on the display.

For this, the head mounted device 300 includes an eye tracking unit for detecting a pupil of the user 10, 20. In detail, the eye tracking unit includes cameras (preferably, infrared ray cameras) respectively at the front of both left and right eyes in the head mounted device 300. In addition, the control unit 500 detects locations of the pupils of both left and right eyes from the image obtained from the camera by using the image recognition algorithm described above. From the locations of the pupils of both eyes, a gazing point is calculated. Subsequently, when capturing the virtual space from the virtual camera of the virtual space, the control unit 500 generates an image focused at the calculated gazing point of the user and displays the image on the display.

By doing so, an image of the virtual space more close to the nature of the human sight may be provided, thereby enhancing the reality of the virtual space further.

Meanwhile, if the eye tracking function is applied, in the initializing step for enjoying the virtual reality system of the present disclosure, namely in the calibration step, initial locations of the pupils of both eyes of the user 10, 20 are detected, and a gazing point is calculated based on the initial locations. At this time, the initial locations may be detected by guiding the user to gaze a plurality of points (for example, upper, lower, right and left corners and a center) in an initial image displayed on the display, and then detecting locations of the pupils of both eyes at that time.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A battle training system based on virtual reality, comprising:

a gun which is possessed by each of at least two users and transmits a shooting signal wireles sly when shooting;

at least one sensor configured to sense an actual location and a gazing direction of each of the at least two users, in at least one play ground defined within an actual space of a real world to have a predetermined area in which the users are actually movable, and sense a direction of a gunpoint of the gun;

a head mounted device having a display for displaying an image of a virtual space and worn by each user to surround both eyes of each user; and a control unit configured to calculate an actual location and a gazing direction of each user in the play ground according to a signal received from the at least one sensor, and transmit the image of the virtual space formed corresponding to real objects in the play ground, observed at the actual location and in the gazing direction of each user, to the head mounted device of each user, wherein when any one user is present in an actual space corresponding to an actual location and a gazing direction of the other user, the control unit is configured to display a virtual object corresponding to any one user in a virtual space of the other user in an actual direction with a size proportional to a distance between the users, wherein when receiving the shooting signal, the control unit is further configured to receive input of the signal from the at least one sensor, calculate the gunpoint direction, and display shooting information at an enemy in the virtual space when the enemy is located in the gunpoint direction in the virtual space;

wherein the at least one play ground includes two play grounds with a same size and structure installed apart from each other, and at least one user is located in each play ground, and wherein the control unit is configured to display a virtual object corresponding to the user in other play ground, in a virtual space transmitting to a head mounted device of the users in each play ground, based on an actual location and a gazing direction of the users in each play ground.

2. The battle training system according to claim 1, wherein the at least one sensor includes a camera sensor, and wherein the control unit is configured to analyze a shape of the user from an image of the user photographed by the camera sensor and display a virtual object corresponding to the analyzed shape of the user in the virtual space.

3. The battle training system according to claim 1, wherein when a user is present in an actual space of any one play ground corresponding to an actual location and a gazing direction of other user in other play ground, the control unit is configured to display a virtual object corresponding to the user in a virtual space of other user in other play ground in an actual direction with a size proportional to a distance between the users.

4. The battle training system according to claim 1, wherein the at least one sensor includes an acceleration sensor or a gyro sensor mounted in the head mounted device, and wherein the control unit is configured to receive input of a signal from the acceleration sensor or gyro sensor, calculate an actual location and a facing direction of the head mounted device, and set it as an actual location and a gazing direction of the user.

5. The battle training system according to claim 1, wherein the at least one sensor includes an acceleration sensor or a gyro sensor mounted in the gun, and
    wherein the control unit is configured to receive input of a signal from the acceleration sensor or gyro sensor and calculate the gunpoint direction.

6. The battle training system according to claim 1, wherein a laser pointer which emits a laser is installed in the gun,
    wherein the at least one sensor includes a camera sensor for recognizing the laser, and
    wherein the control unit is configured to analyze a trajectory of the laser from an image captured by the camera sensor and determine the trajectory of the laser as the gunpoint direction.

7. The battle training system according to claim 1, wherein the at least two user wear a battle clothing comprising a vibration means and a signal receiver,
    wherein the control unit is configured to transmit a control signal about shooting to a signal receiver of a battle clothing of a user corresponding to the enemy, and
    wherein the vibration means is configured to generate vibration when the signal receiver receives the control signal.

\* \* \* \* \*